H. HELMS.
CHAIN DRIVE FOR VEHICLES.
APPLICATION FILED FEB. 15, 1911.
1,008,330.
Patented Nov. 14, 1911.
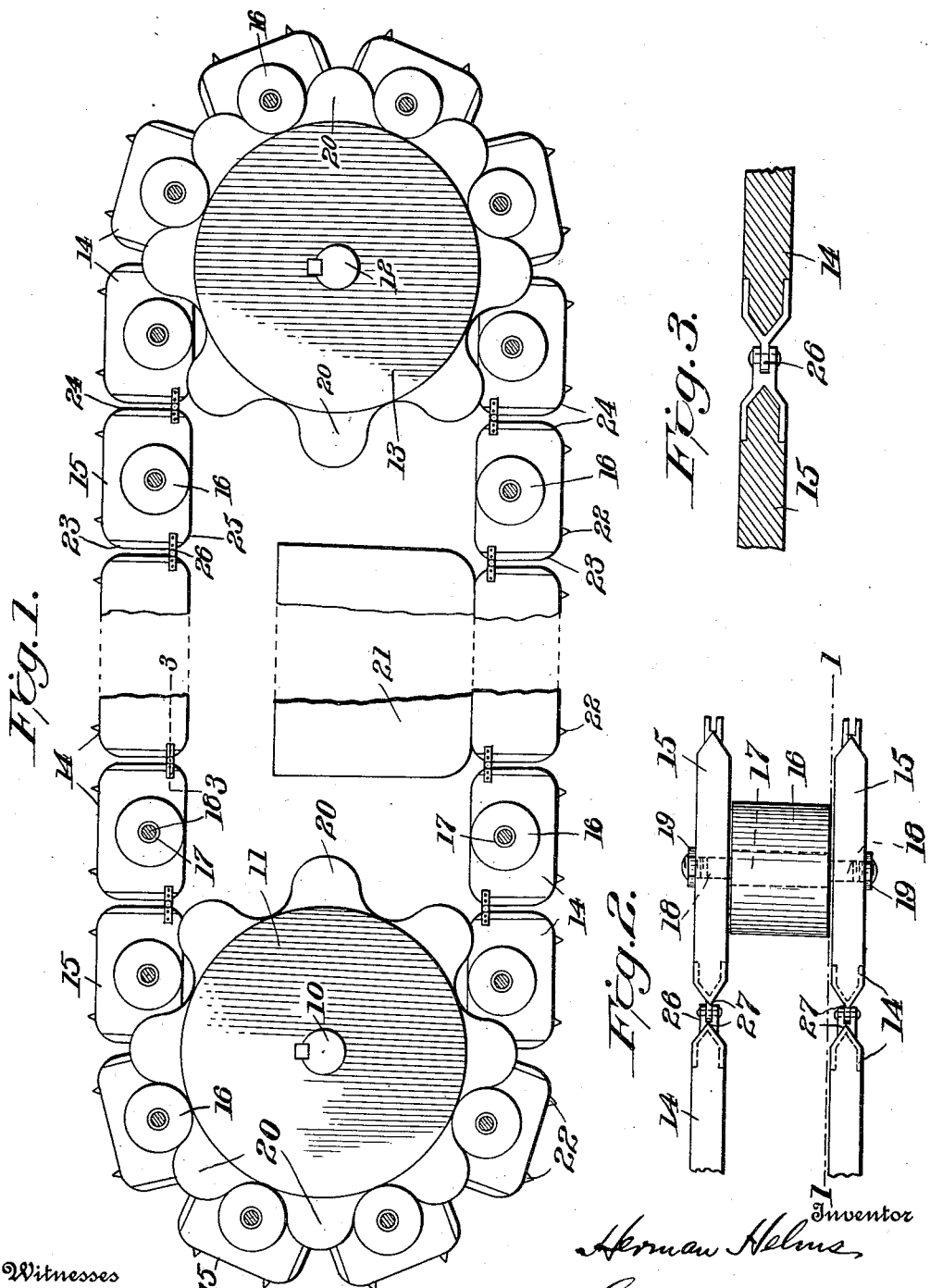

UNITED STATES PATENT OFFICE.

HERMAN HELMS, OF SEYMOUR, WISCONSIN.

CHAIN-DRIVE FOR VEHICLES.

1,008,330.  Specification of Letters Patent.  Patented Nov. 14, 1911.

Application filed February 15, 1911. Serial No. 608,770.

*To all whom it may concern:*

Be it known that I, HERMAN HELMS, a citizen of the United States, residing at Seymour, in the county of Outagamie and State of Wisconsin, have invented certain new and useful Improvements in Chain-Drives for Vehicles, of which the following is a specification.

This invention relates to means for propelling sleighs, ice boats and the like including automobiles on ice or through snow and particularly to a new and improved chain drive for these purposes.

The object of the invention is to improve generally and increase the utility and ease and reliability of operation of such devices, at the same time preserving simplicity and economy of construction and lessening damage and wear under ordinary strains of use.

With this object in view, the invention consists in the improved construction, arrangement and combination of parts hereinafter fully described and afterward specifically pointed out in the appended claims.

In order that others may be enabled to make and use the invention, I will now proceed to specifically describe a preferred embodiment thereof, which is illustrated in the accompanying drawing in which—

Figure 1, represents a view in vertical longitudinal section of the attachment to be mounted upon the vehicle to be driven, the sprocket and rollers being shown in elevation, the section being taken on the plane indicated by the broken line 1—1, of Fig. 2, and the center being broken out to shorten the figure. Fig. 2, represents a plan view of a portion of the endless drive chain. Fig. 3, represents a sectional detail view on the plane indicated by the broken line 3—3 of Fig. 1.

Like reference characters mark the same parts wherever they appear in the several figures of the drawings.

Referring specifically to the drawings, 10 indicates a shaft suitably journaled in any desired portion of the frame of the vehicle upon which is keyed, or otherwise rigidly secured, a sprocket wheel 11. This shaft, preferably the front or forward shaft, is connected up with and driven by any suitable motor, such as for instance, a gasolene engine or electric motor carried by an automobile, an ice boat, a sleigh, or other vehicle suitable to drive over hard snowy roads or fields or roads of ice. A similar shaft 12, is mounted in the frame at the opposite end of the vehicle and has a similar sprocket wheel 13 pinned or otherwise rigidly secured to it. Around the two sprocket wheels is mounted an endless drive chain composed of links 14, each comprising two separate side pieces 15 spaced apart a distance greater than the thickness of the sprocket wheels, and a roller 16 mounted to rotate on a shaft 17 rigidly secured in the side pieces, said shaft having a central portion upon which the roller is adapted to revolve, and reduced ends 18 which are rigidly secured in the side pieces by means of nuts 19 threaded on said reduced ends and tightly clamping the side pieces between said nuts and the shoulders at the begining of the reduced ends. The rollers 16 engage between the teeth 20 of the sprocket wheels 11 and 13 and the endless chain is thereby carried around when either of the wheels is revolved, the side pieces passing along on the outside of the teeth and thus preventing lateral displacement of the chain from the wheels.

At 21 is indicated a rigid portion of the vehicle, such for instance as the runner of an ice-boat, or of a sleigh, and the chain, the lower half of which rests upon the road or ice and supports the vehicle, in its movement around the sprocket wheel, engages with said road, or ice and propels the vehicle forward thereon, being provided with spikes 22 projecting beyond the outer edges of the side pieces 15 serving to prevent the slipping of said side pieces.

The side pieces 15 are flat and have substantially parallel straight tops and bottom edges and substantially parallel straight front and rear ends, as at 23 and 24, said edges and ends being joined by curved corners, as seen at 25. At about the junction of one of the curved corners, adjacent side pieces 15 are pivotally connected together by strong hinges 26 of any suitable form to permit of the passage of the chain around the sprocket wheels, such pivotal points being thus positioned inside of the longitudinal center of the side pieces and at one extremity of the straight, front and rear edges of the side pieces, and said front and rear edges 23 and 24 being formed with beveled or knife edges 27, so that any snow taken up between adjacent side pieces 15 while on the ground, or turning upward at the rear, will be forced laterally by such edges when they come together at the top of the rear sprocket wheel, and dropped off the sides of the links.

With a gasolene engine or other suitable motor connected up with one of the sprocket wheels, preferably the front one, a vehicle of the class described may be rapidly propelled and the contact between the rigid parts of the vehicle and the supporting side pieces of the links of the endless chain being entirely on the rollers, the motion will be smooth and easy, with minimum of friction.

The pivots or shafts 17 upon which the rollers 16 rotate are located inside of the longitudinal center of the side pieces so that when the chain is moving rearward and under the vehicle, said rollers will be raised as far as possible off the ground or ice, thus preventing obstruction to the motion of the vehicle by contact of the rollers with snow or ice over which the vehicle is moving.

The construction and operation of my invention being thus fully and specifically described, I desire it to be understood that many changes and variations in such specific construction may be made, without departing from the spirit and scope of the invention.

Having thus fully described my invention, what I claim as new and desire to secure by Letters Patent of the United States is:

1. A device of the character described comprising front and rear sprocket wheels and an endless chain passing around the sprocket wheels, said chain including pivoted links, each link having its opposite sides at opposite ends beveled to provide the front and rear ends of each link with sharp edges for the purpose set forth.

2. A device of the character described comprising front and rear sprocket wheels and an endless chain passing around the same, said endless chain comprising pivoted links each of which consists of two parallel flat side pieces vertically arranged, a roller rotatably mounted between the side pieces of each link, each side piece having substantially parallel top and bottom and front and rear straight edges connected by curved corners, the pivotal connections of the links being located at the junction of the straight, front and rear edges and the curved corners, said front and rear edges being beveled for the purpose set forth.

In testimony whereof I affix my signature in presence of two witnesses.

HERMAN HELMS.

Witnesses:
 WALTER EICK,
 F. R. DITTMER.

---

Copies of this patent may be obtained for five cents each, by addressing the "Commissioner of Patents, Washington, D. C."